(12) United States Patent
Kim

(10) Patent No.: US 12,463,239 B2
(45) Date of Patent: Nov. 4, 2025

(54) IN-LINE MANUFACTURING APPARATUS FOR LITHIUM METAL BATTERY

(71) Applicant: ENERGY TECH SOLUTION CO., LTD., Seoul (KR)

(72) Inventor: Young Hwan Kim, Incheon (KR)

(73) Assignee: ENERGY TECH SOLUTION CO., LTD., Seoul (KR)

( * ) Notice: Subject to any disclaimer, the term of this patent is extended or adjusted under 35 U.S.C. 154(b) by 0 days.

(21) Appl. No.: 18/292,331

(22) PCT Filed: Apr. 29, 2022

(86) PCT No.: PCT/KR2022/006166
§ 371 (c)(1),
(2) Date: Jan. 25, 2024

(87) PCT Pub. No.: WO2023/008695
PCT Pub. Date: Feb. 2, 2023

(65) Prior Publication Data
US 2024/0332601 A1    Oct. 3, 2024

(30) Foreign Application Priority Data
Jul. 26, 2021    (KR) .................. 10-2021-0098106

(51) Int. Cl.
*H01M 10/052* (2010.01)
*H01M 10/04* (2006.01)
*H01M 10/0583* (2010.01)

(52) U.S. Cl.
CPC ..... *H01M 10/052* (2013.01); *H01M 10/0404* (2013.01); *H01M 10/0459* (2013.01); *H01M 10/0583* (2013.01)

(58) Field of Classification Search
CPC ............... H01M 10/052; H01M 10/04; H01M 10/0404; H01M 10/0459; H01M 10/0583
See application file for complete search history.

(56) References Cited

U.S. PATENT DOCUMENTS

| 2019/0229360 A1* | 7/2019 | Böhm | H01M 4/139 |
| 2019/0237750 A1* | 8/2019 | Kim | H01M 4/366 |

(Continued)

FOREIGN PATENT DOCUMENTS

| CN | 1218579 A * | 6/1999 | .............. H01M 4/12 |
| JP | 2018147836 A * | 9/2018 | |

(Continued)

OTHER PUBLICATIONS

English translation of JP2018147836A—Method for producing lithium doped negative electrode; Toyota Ind Corp; Sep. 20, 2018 (Year: 2018).*

(Continued)

*Primary Examiner* — Adam J Francis
(74) *Attorney, Agent, or Firm* — Rabin & Berdo, P.C.

(57) ABSTRACT

An in-line manufacturing apparatus for a lithium metal battery comprises: a lithium foil tape unwinder peeling a release film on the lithium foil tape and transferring the lithium foil tape peeled off the release film to a notching part; the notching part forming an anode plate having an electrode tab by processing the lithium foil tape; and a stacking part inserting a separator film between the anode plate and a cathode plate directly transferred from the notching part in a zigzag manner to alternately stack the separator film.

2 Claims, 8 Drawing Sheets

(56) References Cited

U.S. PATENT DOCUMENTS

| | | | | |
|---|---|---|---|---|
| 2019/0273279 | A1* | 9/2019 | Sale | H01M 10/0459 |
| 2020/0161629 | A1* | 5/2020 | Woo | H01M 4/0471 |
| 2023/0155159 | A1* | 5/2023 | Park | G01B 11/06 29/730 |
| 2023/0352797 | A1* | 11/2023 | Abe | H01M 50/406 |
| 2023/0411669 | A1* | 12/2023 | Lim | H01M 10/0413 |

FOREIGN PATENT DOCUMENTS

| | | |
|---|---|---|
| KR | 1020190012973 A | 2/2019 |
| KR | 1020190077835 A | 7/2019 |

OTHER PUBLICATIONS

English Translation of CN1218579 A—Method and device for sticking lithium foil and manufacture of lithium electrode; Fuji Photo film co LTD; Jun. 2, 1999 (Year: 1999).*

* cited by examiner

12

IN-LINE MANUFACTURING APPARATUS FOR LITHIUM METAL BATTERY

TECHNICAL FIELD

The present invention relates to an in-line manufacturing apparatus for lithium metal batteries, and more specifically, to an in-line manufacturing apparatus in which a storage process is omitted to solve a problem of decreased productivity caused by stickiness of lithium metal.

BACKGROUND ART

Lithium-ion batteries are generally composed of cathode, anode, electrolyte, and separator film. The cathode determines the capacity and voltage of the battery as a source of lithium ions. The anode uses graphite having a stable structure as a function of reversibly absorbing/discharging lithium ions from the cathode and flowing current through an external circuit. The electrolyte acts as a medium to move lithium ions between the cathode and the anode, using materials with high ion conductivity. The separator film serves as a physical barrier to prevent the anode and cathode from mixing with each other, enabling only the movement of ions.

The anode determines the lifespan and capacity of the battery. In the beginning, lithium metal was directly used for the anode, but the use of stable graphite materials in layered structures has been adopted due to safety concerns. Recently, silicon has gained attention for its energy density over 10 times higher than graphite and fast charging/discharging rate. However, research is needed to stabilize silicon, which expands in volume over 3-4 times more than graphite.

The manufacturing process of the lithium-ion battery is largely divided into electrode process, assembly process, and chemical conversion process, and the detailed process is different for each battery type and manufacturer.

The electrode process is a process of making cathode and anode plates, and is performed of mixing, coating, pressing, and slitting on a current collector substrate using a mixture in which cathode/anode active materials, conductive materials, and binders are mixed, and the cathode and anode manufacturing processes are carried out respectively.

The assembly process is a process of assembling the cathode and anode plates made through the electrode process according to a cell shape with the separator film. The assembly process is performed of notching, stacking, tab welding, and packaging, and the electrode plates are stacked by winding or stacking as much as the capacity of a cell.

The notching process is a process of cutting the electrode plate to an appropriate size according to the shape of the battery to manufacture tabs for the cathodes and anodes, and it influences the production speed of the battery.

The notching process is performed by a press or a laser apparatus, and the press apparatus with a sharp press blade cuts a roll-type cathode/anode plates directly up and down so periodic blade replacement and maintenance are required. The laser apparatus cuts using an IR laser, so there is no additional maintenance cost, and the production speed is fast, but the initial investment cost is high.

After the notching process is completed, the electrode plates are wound or stacked by stacking according to the shape of the cell such as cylindrical, prismatic, pouch type to obtain a desired cell capacity.

The chemical conversion process is a process for activating and stabilizing the lithium-ion battery. It charges/discharges the assembled battery to give it electrical characteristics and performs quality inspection and selection of the battery.

After the notching process, the stacking process includes a method of notching and stacking with a laser, or a method of stacking after notching using a mold.

As a next-generation battery, lithium metal batteries that use lithium metal as the anode can increase their energy density to more than 1,000 Wh/L, which is higher than 800 Wh/L of lithium-ion batteries, so R&D is being concentrated.

The lithium metal itself is soft and sticky, and there is a problem in that it sticks to each other, or foreign substances stick to the lithium metal, so it is difficult to make a lithium foil of less than 100 µm. In a punching or notching process using a mold, the sticky phenomenon in which the lithium metal is stained on the mold occurs, causing a defect and degrading productivity. In addition, when the lithium metal is stored in a magazine after notching, there is a problem in that the anode sticks to each other under pressure due to its own weight. In order to solve the above problem, loading a minimal amount that does not adhere can lead to a decrease in productivity due to frequent magazine replacements.

Therefore, in order to use metallic lithium as the anode material, it is necessary to prevent it from sticking to rollers in the pressing process for making lithium foil, a special manufacturing process is required to prevent it from sticking to the mold in the notching process, and the magazine storage process must be omitted.

The Korean Patent Publication 10-2019-0077835 is intended to solve the problems of a stack-and-folding type electrode assembly but does not suggest a solution when lithium metal is used as anode material, including a stacking part in which the cathode cell and the anode cell are continuously manufactured and alternately stacked.

DETAILED DESCRIPTION OF THE INVENTION

Technical Challenge

The present invention provides an apparatus for manufacturing a lithium metal battery, in which a process of storing in a magazine is eliminated to solve a phenomenon that a lithium metal is used as anode material during an assembly process, and a notching process and a stacking process are combined in an in-line technology.

Technical Solution

An apparatus for manufacturing a lithium metal battery according to the present invention comprises: a lithium foil tape unwinder peeling a release film on a lithium foil tape and transferring the lithium foil tape peeled off release film to a notching part; the notching part processing the lithium foil tape to form an anode plate having an electrode tab; and a stacking part inserting a separator film between the anode plate and the cathode plate directly transferred from the notching part in a zigzag manner to alternately stack the separator film.

The notching part is characterized in that lithium is not stained by using a laser cutter.

The notching part is configured by coupling the laser cutter and a slitter, the slitter cuts the lithium foil tape in a longitudinal direction, and the laser forms a tab while cutting the lithium foil tape in a transverse direction.

The stacking part may be stacked between the cathode plate and the anode plate with the separator film inserted between the cathode plate and the anode plate.

The lithium foil tape unwinder comprises: a release film rewinder which winds and winds the release film inserted between lithium foils so that the lithium foils do not stick to each other; a vision inspection part which optically scans and inspects whether the release film and the lithium foil tape are defective; and a pair of dancer rolls to minimize tension change caused by sudden tension disturbances.

Advantageous Effects

The apparatus for manufacturing a lithium metal battery according to the present invention eliminates the process of storing the lithium metal battery in the magazine and can solve the phenomenon that the lithium metal is attached to each other during the assembly process when the lithium metal is used as the anode material in which the notching process using a laser and the stacking process are combined using in-line technology.

In addition, since the stacking process is performed in-line without a magazine storage process after the notching process, productivity may be improved.

MODE FOR INVENTION

The present invention uses lithium metal as an anode material of a battery. The battery is called as a 'lithium metal battery' to distinguish it from a 'lithium-ion battery' using conventional graphite or the like as an anode material.

Figure 1:
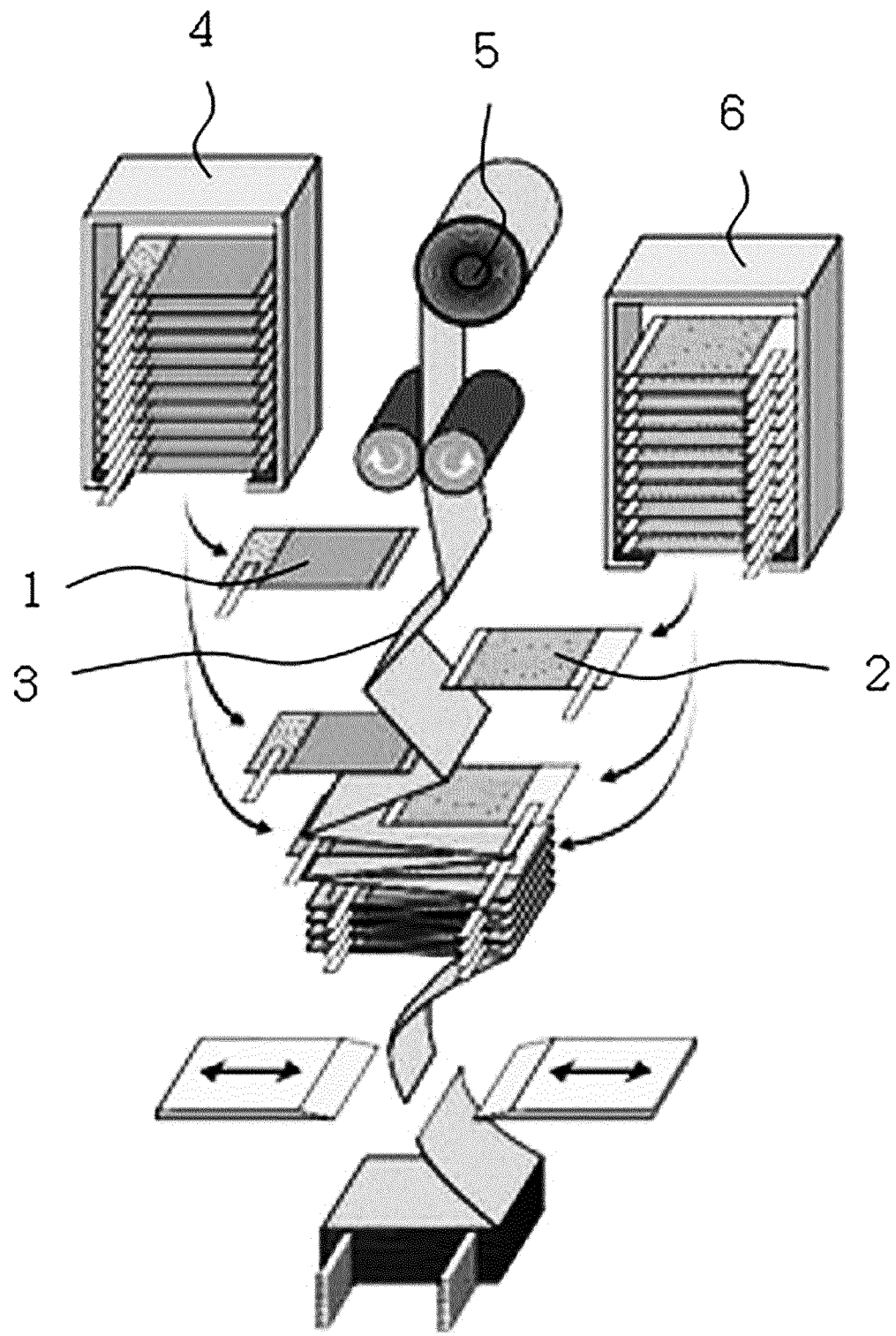
FIG. 1 is a conceptual diagram of a conventional zigzag stacking apparatus.

FIG. 1 is a conceptual diagram illustrating a conventional zigzag stacking apparatus, demonstrating the concept in which a battery cell is formed by inserting a separator film 3 into a zigzag shape from a separator film unwinder 5 while alternately stacking a cathode plate 1 stacked on a cathode magazine 4 and an anode plate 2 stacked on an anode magazine 6.

As explained in the background art, when the anode material is used as lithium metal, the anode plates 2 stacked on the anode magazine 6 may stick to each other due to their own weight due to the stickiness of the lithium metal, causing the continuous stacking process to be interrupted. Therefore, if only a small amount is stacked on the magazine so that they do not stick together, productivity decreases due to frequent magazine replacement.

Figure 2:
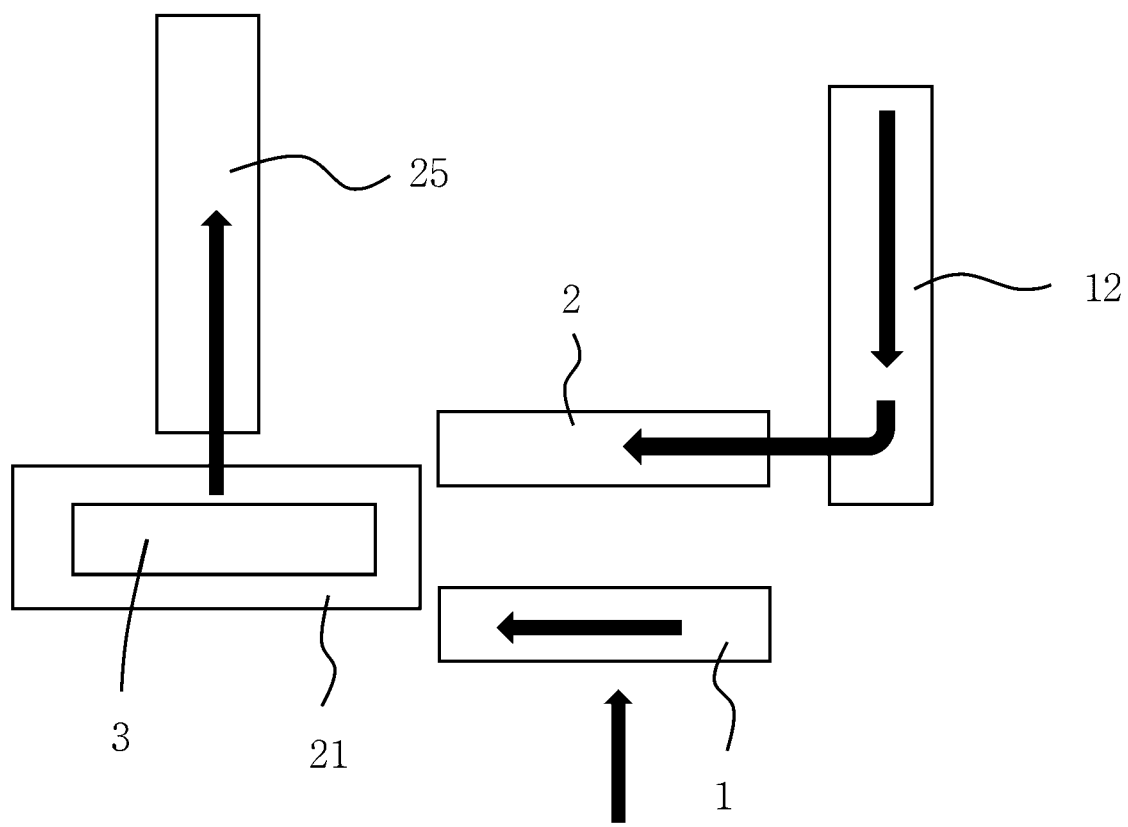
FIG. 2 is a block diagram of an in-line manufacturing apparatus according to an embodiment of the present invention.
Figure 3:
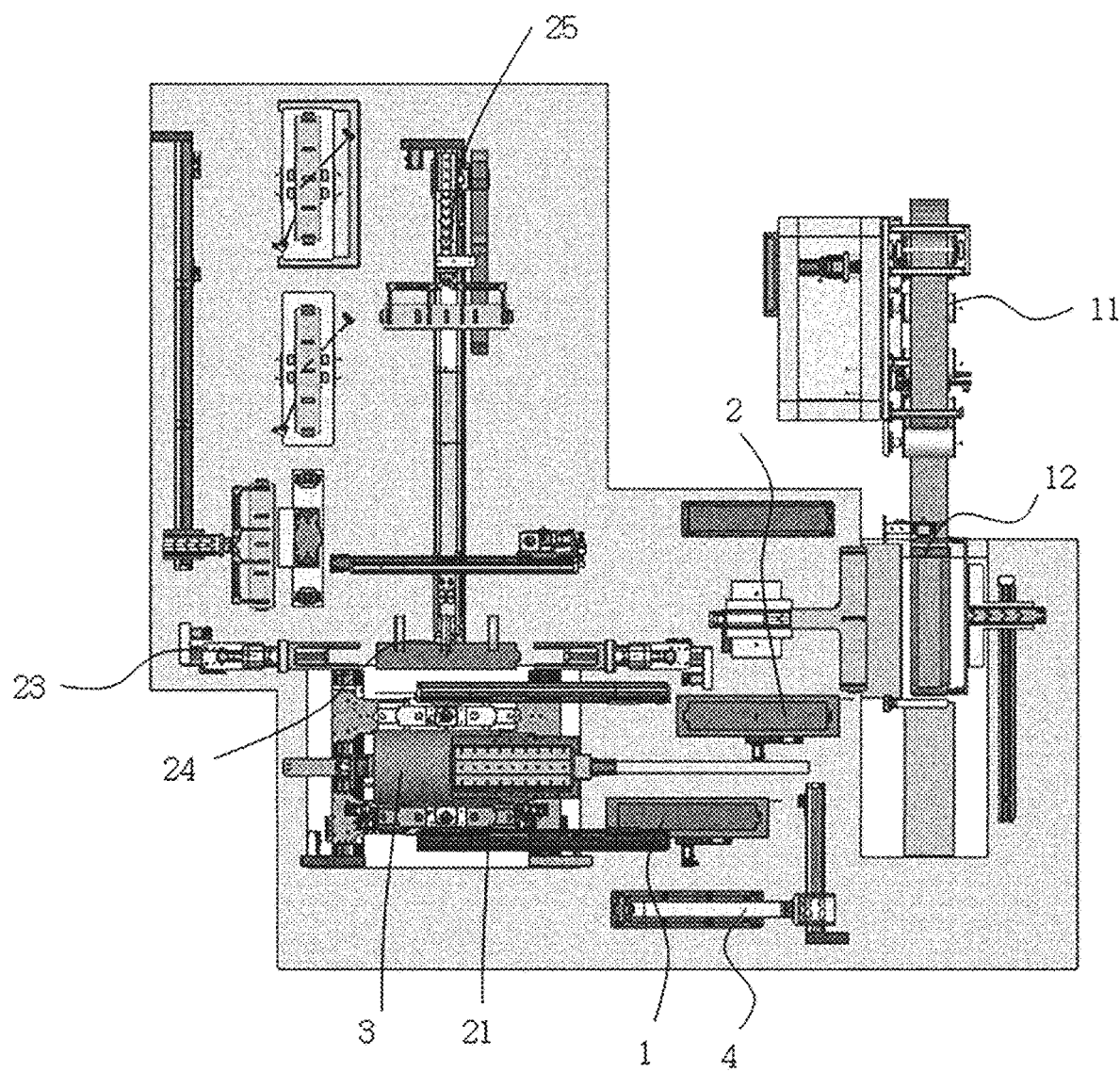
FIG. 3 is a plan view of an in-line manufacturing apparatus according to an embodiment of the present invention.

The present invention can improve productivity by solving the problem of anode electrode plates sticking to each other by performing the stacking process following the notching process in-line without a magazine storage process. FIG. 2 is a block diagram of the in-line manufacturing apparatus according to the present invention, in which the anode plate 2 is formed by a notching process using a laser, and the anode plate 2 is directly transferred to the stacking part 21 without being stored in the magazine, so that the separator film 3 is alternately inserted and stacked on the cathode plate 1 and discharged to the discharge part 25. FIG. 3 is a plan view of the in-line manufacturing apparatus according to the present invention, where the lithium foil tape, which is peeled off from the unwinder 11, is fed into the notching part 12 and processed into the anode plate 2.

Figure 4:
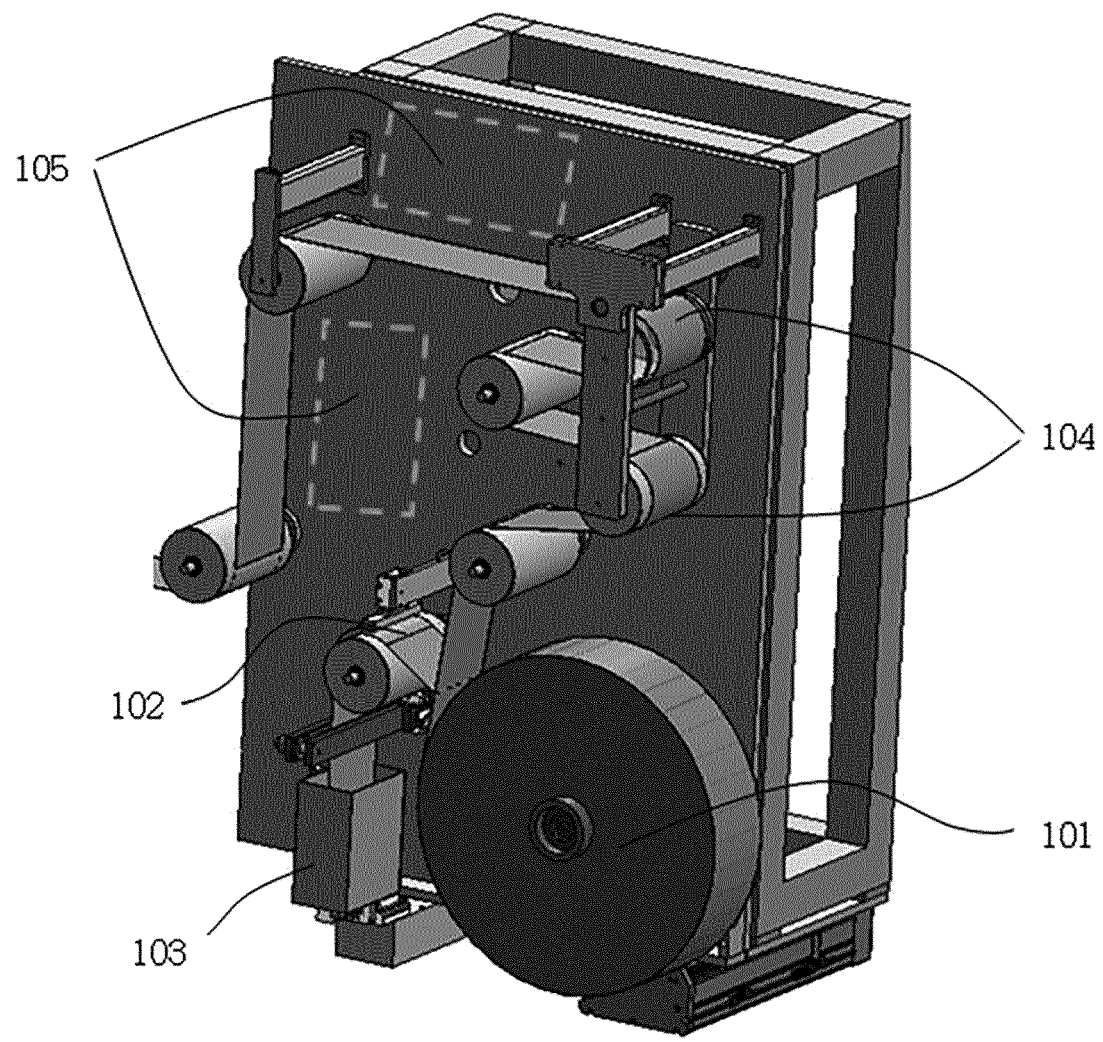
FIG. 4 is a perspective view of a lithium foil tape unwinder according to the present invention.

FIG. 4 is a perspective view of the lithium foil tape unwinder, and includes a release film rewinder 103 wound while peeling off the release film 102 inserted between the lithium foils such that the lithium foils do not stick to each other, a dancer roll 104 for minimizing a change in tension with respect to the sudden tension disturbances, and a vision inspection part 105 for optically scanning and inspecting whether the lithium foil tape is defective.

The rolls of the in-line manufacturing apparatus use polypropylene or nylon rolls instead of metal rolls so as not to react with the lithium metal.

Figure 5:
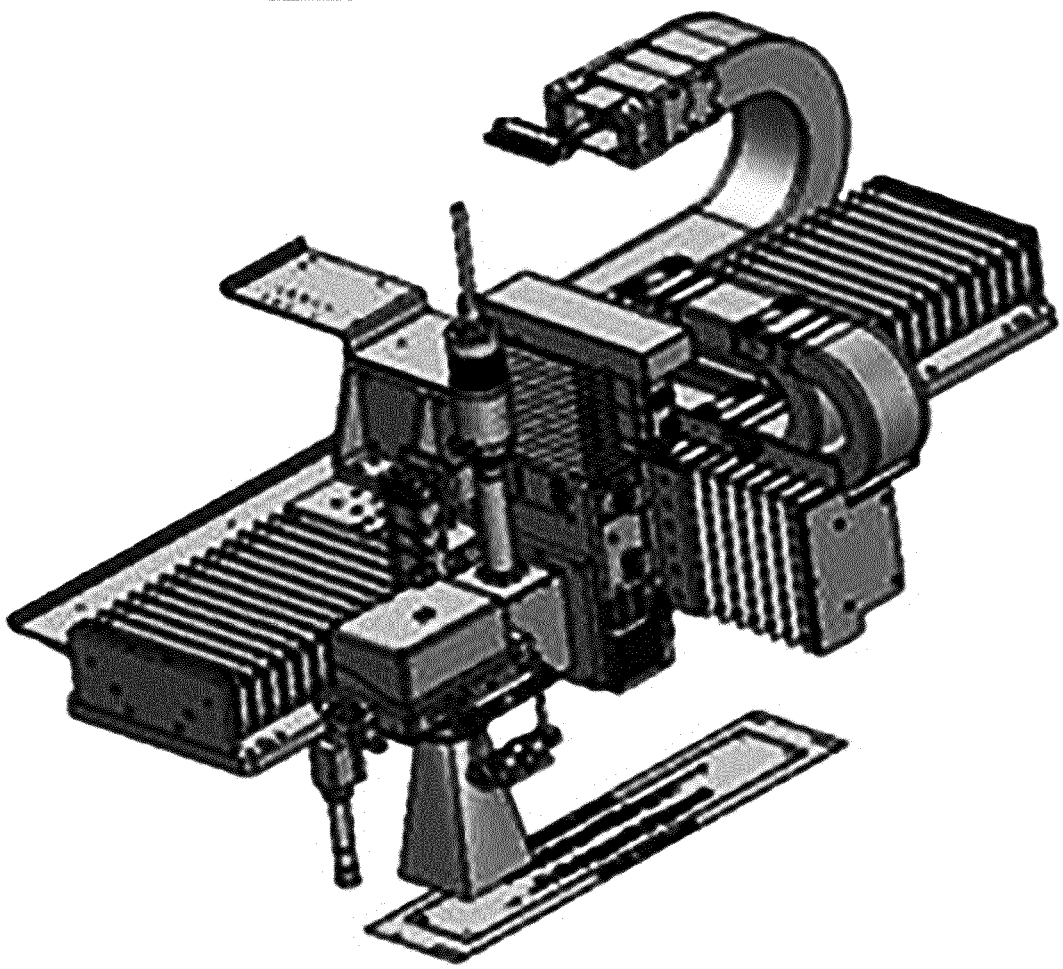
FIG. 5 shows a laser apparatus constituting a notching part according to the present invention.
Figure 6:
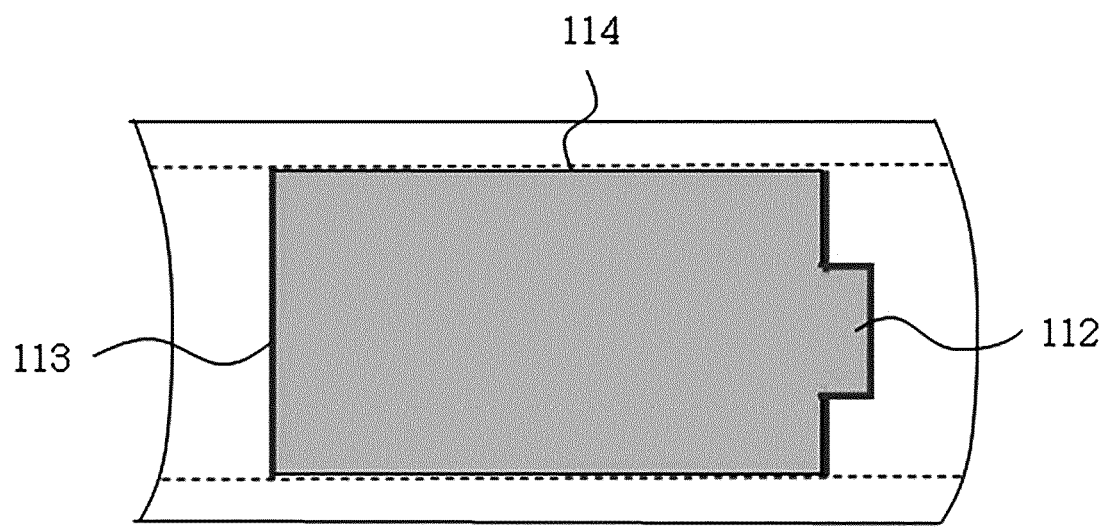
FIG. 6 shows an anode plate forming a tab by notching process according to the present invention.

FIG. 5 shows a laser apparatus constituting the notching part 12, and FIG. 6 shows an anode plate having a tab 112 formed by the notching process. The notching part cuts the transverse direction 113 and the longitudinal direction 114 using the laser apparatus to form the anode plate having a tab. To solve the problem of sticky lithium foil sticking to the press blade and reducing quality and productivity, it is cut using a laser. In general, the power of laser for cutting the anode plate is at a maximum of 200 W, but in the present invention, a 300 W laser is used in order to receive a small influence on tolerance of upper and lower positions of the electrode.

In another embodiment of the notching part, the horizontal direction 113 is cut by a laser by coupling a laser and a slitter, and the longitudinal direction 114 is cut using a slitter to form the anode plate having the tab.

Figure 7:
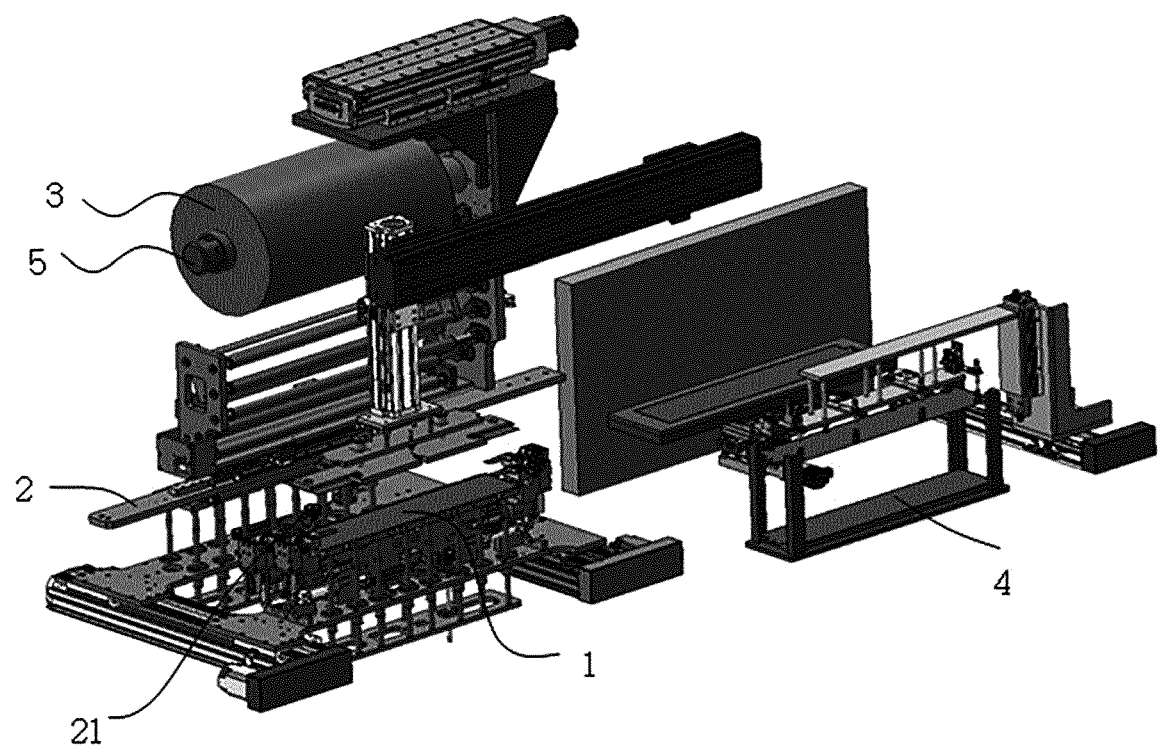
FIG. 7 is a perspective view of a stacking part according to an embodiment of the present invention.

FIG. 7 is a perspective view of the zigzag stacking part 21 according to the present invention. The anode plate 2 processed in the notching part is transferred to be stacked in a zigzag shape with the separator film 3 inserted between the cathode plate 1 stored in the cathode plate magazine 4. The separator film 3 is supplied from the separator film unwinder 5.

Figure 8:
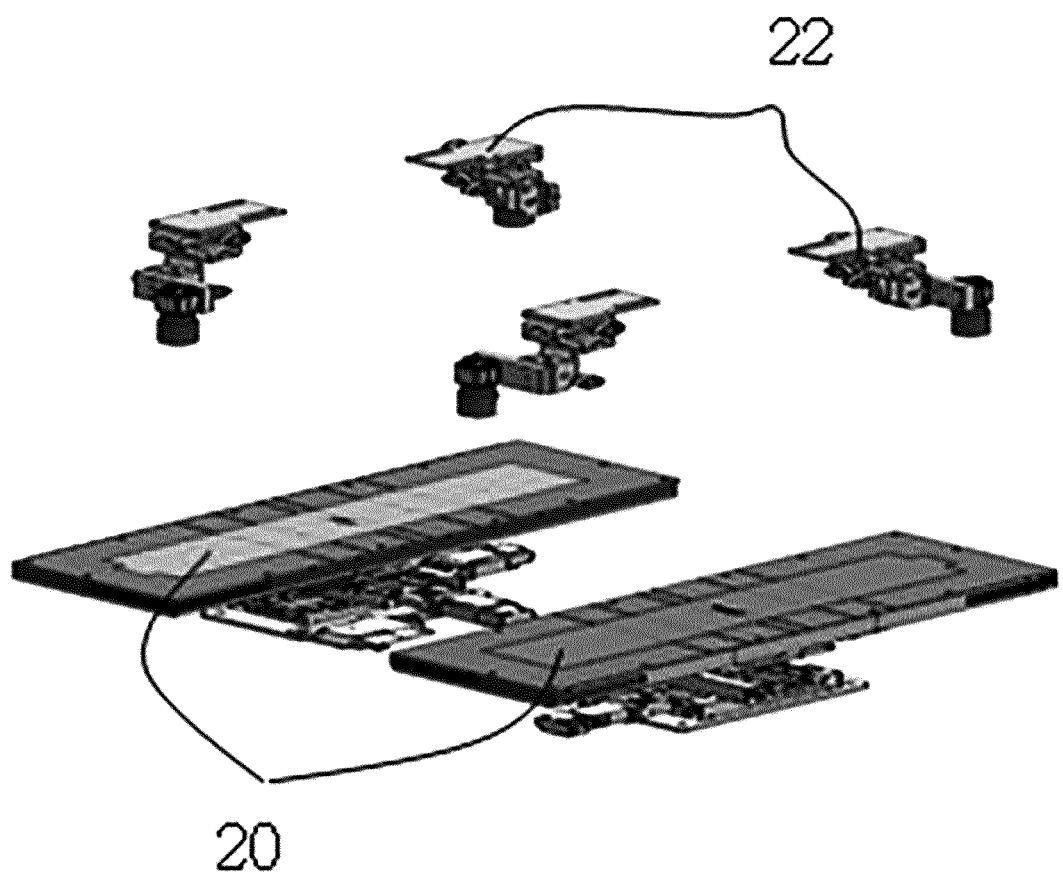
FIG. 8 is a perspective view of a vision inspection part according to the present invention.

FIG. 8 shows a process of aligning the cathode plate and the anode plate on the stacking part 20 of the stacking part, and alignment is performed using the camera 22.

Figure 9:
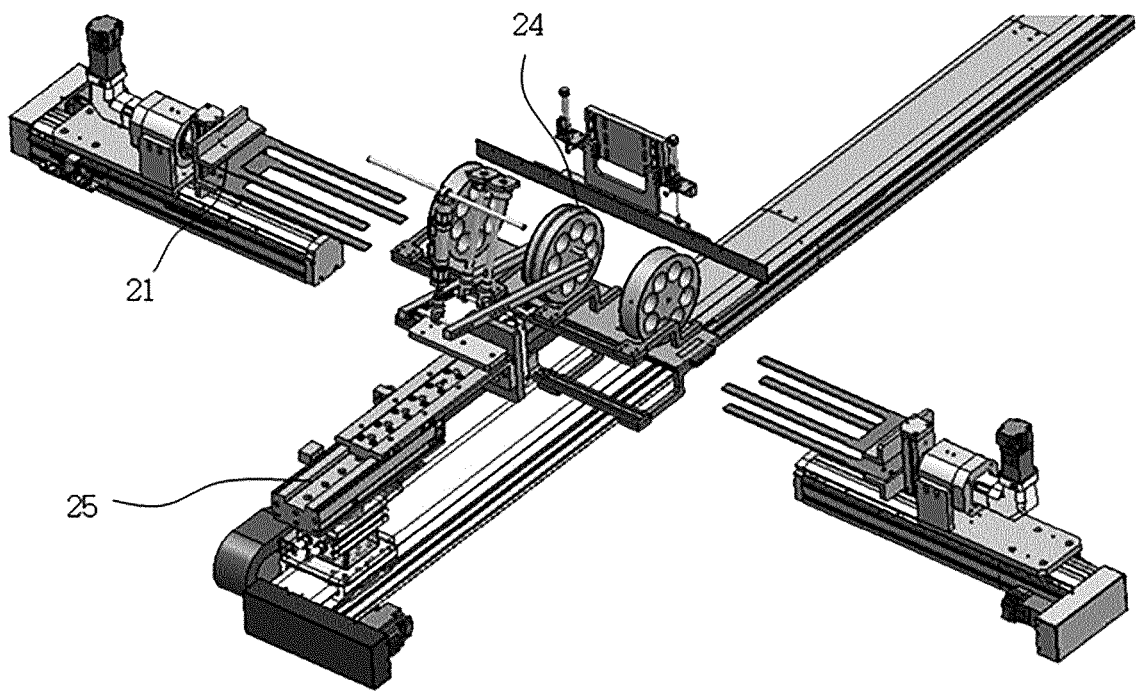
FIG. 9 shows a packing part and a taping part according to the present invention.

FIG. 9 shows a packing part and a taping part according to the present invention.

The packing part 23 fixes the anode plate and the cathode plate by wrapping the outer periphery of the cell stacked in the stack with the separator film twice.

The taping part 24 fixes the edge of the separator film to a tape.

The take-out part 25 transfers the stacked cells from the stacking part to the outside.

INDUSTRIAL AVAILABILITY

The apparatus for manufacturing a lithium metal battery according to the present invention is a manufacturing apparatus which eliminates a process stored in a magazine and combines a notching process using a laser and a stacking process with an in-line technology and may be used when a lithium metal is used as an anode material in a battery assembly process.

In addition, since the stacking process is performed in-line without a magazine storage process after the notching process, productivity may be improved.

The invention claimed is:

1. An in-line manufacturing apparatus for a lithium metal battery, comprising:
   a lithium foil tape unwinder peeling a release film on a lithium foil tape and transferring the lithium foil tape with the release film peeled off to a notching part;
   the notching part forming an anode plate having an electrode tab by processing the lithium foil tape; and
   a stacking part inserting a separator film between the anode plate and a cathode plate directly transferred from the notching part in a zigzag manner to alternately stack the separator film;
   wherein the notching part cuts in a transverse direction by coupling a laser and a slitter, and cuts in a longitudinal direction using a slitter, to form the anode plate having the tab.

2. The in-line manufacturing apparatus as claimed in claim 1, wherein the lithium foil tape unwinder comprises:
   a release film rewinder which winds the release film inserted between lithium foils so that the lithium foils do not stick to each other;
   a vision inspection part which optically scans and inspects whether the release film and the lithium foil tape are defective; and
   a pair of dancer rolls to minimize tension change caused by sudden tension disturbances.

* * * * *